(12) United States Patent
Barratt et al.

(10) Patent No.: US 10,604,611 B2
(45) Date of Patent: Mar. 31, 2020

(54) REVERSE-PHASE POLYMERISATION PROCESS

(71) Applicant: BASF SE, Ludwigshafen (DE)

(72) Inventors: John Scott Barratt, Mirfield (GB); Aleksandra Jelicic, Mannheim (DE); Pascal Hesse, Mannheim (DE); Oliver Soetje, Mannheim (DE); Robert Haschick, Mannheim (DE); Gabriela Eugenia Fonseca Zepeda, Mannheim (DE); Shankara Narayanan Keelapandal Ramamoorthy, Limbergerhof (DE); Sandra Jeck, Mannheim (DE); Jelan Kuhn, Mannheim (DE)

(73) Assignee: BASF SE, Ludwigshafen (DE)

( * ) Notice: Subject to any disclaimer, the term of this patent is extended or adjusted under 35 U.S.C. 154(b) by 223 days.

(21) Appl. No.: 14/908,823

(22) PCT Filed: Jul. 29, 2014

(86) PCT No.: PCT/EP2014/066251
§ 371 (c)(1),
(2) Date: Jan. 29, 2016

(87) PCT Pub. No.: WO2015/014824
PCT Pub. Date: Feb. 5, 2015

(65) Prior Publication Data
US 2016/0159958 A1 Jun. 9, 2016

(30) Foreign Application Priority Data
Jul. 31, 2013 (EP) ..................................... 13178691

(51) Int. Cl.
*C08F 265/04* (2006.01)
*C08J 11/02* (2006.01)
(Continued)

(52) U.S. Cl.
CPC .......... *C08F 265/04* (2013.01); *B01D 61/027* (2013.01); *B01D 61/14* (2013.01);
(Continued)

(58) Field of Classification Search
CPC ...... C08F 2/32; C08F 265/04; B01D 2315/10; B01D 21/0063
See application file for complete search history.

(56) References Cited

U.S. PATENT DOCUMENTS 3,427,978 A  2/1969  Hanneman et al.
4,444,961 A  4/1984  Timm
(Continued)

FOREIGN PATENT DOCUMENTS

CN    1191496 A     8/1998
EP    0 051 210 A2  5/1982
(Continued)

OTHER PUBLICATIONS

Notification of Reason for Refusal dated Jan. 30, 2017 in Japanese Patent Application No. 2016-530487 (English translation only).
(Continued)

*Primary Examiner* — Mark S Kaucher
(74) *Attorney, Agent, or Firm* — Oblon, McClelland, Maier & Neustadt, L.L.P.

(57) ABSTRACT

A reverse-phase suspension polymerisation process for the manufacture of polymer beads comprising forming aqueous monomer beads of an aqueous solution comprising water-soluble ethylenically unsaturated monomer or monomer blend and polymerising the monomer or monomer blend to form polymer beads while suspended in a non-aqueous liquid, recovering polymer beads, and then cleaning the non-aqueous liquid in which the process comprises providing the non-aqueous liquid in a vessel (1), forming a suspension of monomer beads from the aqueous monomer
(Continued)

or monomer blend in the non-aqueous liquid, initiating polymerisation to form polymerising beads, removing a suspension of the polymer beads in non-aqueous liquid from the vessel and recovering, water soluble or water swellable polymer beads from the suspension, in which the non-aqueous liquid contains impurities which comprise particles, and then transferring the non-aqueous liquid from the suspension to a cleaning stage, in which the cleaning stage provides a cleaned non-aqueous liquid suitable for use in a reverse-phase suspension polymerisation process, which cleaning stage comprises removing particles from the non-aqueous liquid in at least one filtration step. The invention also relates to the apparatus suitable for carrying out a reverse-phase suspension polymerisation and polymer beads obtainable by the process or employing the apparatus. The invention further relates to a cleaned non-aqueous liquid obtainable by the process.

14 Claims, 2 Drawing Sheets

(51) Int. Cl.
| | |
|---|---|
| C08F 2/32 | (2006.01) |
| B01J 19/12 | (2006.01) |
| B01D 61/14 | (2006.01) |
| B01J 19/24 | (2006.01) |
| B01J 4/00 | (2006.01) |
| B01D 61/02 | (2006.01) |
| C08J 3/12 | (2006.01) |
| C08F 220/56 | (2006.01) |
| C08F 220/20 | (2006.01) |
| C08F 220/06 | (2006.01) |
| C08F 220/38 | (2006.01) |
| C08F 226/10 | (2006.01) |

(52) U.S. Cl.
CPC ............ *B01J 4/002* (2013.01); *B01J 19/123* (2013.01); *B01J 19/24* (2013.01); *B01J 19/243* (2013.01); *C08F 2/32* (2013.01); *C08J 3/12* (2013.01); *C08J 11/02* (2013.01); *B01D 2311/25* (2013.01); *B01D 2315/10* (2013.01); *B01J 2219/0869* (2013.01); *B01J 2219/0877* (2013.01); *B01J 2219/185* (2013.01); *B01J 2219/1923* (2013.01); *B01J 2219/24* (2013.01); *C08F 220/06* (2013.01); *C08F 220/20* (2013.01); *C08F 220/56* (2013.01); *C08F 226/10* (2013.01); *C08F 2220/382* (2013.01); *C08F 2220/385* (2013.01); *C08J 2351/00* (2013.01)

(56) References Cited

U.S. PATENT DOCUMENTS

| | | | |
|---|---|---|---|
| 5,548,047 | A | 8/1996 | Ito et al. |
| 6,277,932 | B1 | 8/2001 | Whitley et al. |
| 6,291,605 | B1 | 9/2001 | Freeman et al. |
| 6,399,730 | B1 | 6/2002 | Freeman et al. |
| 6,508,916 | B1 | 1/2003 | Razzaghi et al. |
| 2009/0166291 | A1* | 7/2009 | Jackson ................. B01D 63/16 210/641 |
| 2010/0121003 | A1* | 5/2010 | Funk .......................... C08F 2/00 526/70 |
| 2010/0181257 | A1* | 7/2010 | Frechet ................ B01D 61/145 210/683 |
| 2011/0294968 | A1 | 12/2011 | Abboud et al. |

FOREIGN PATENT DOCUMENTS

| | | |
|---|---|---|
| EP | 0 952 989 B1 | 9/2002 |
| JP | 2-12962 | 4/1990 |
| JP | 5-17509 A | 1/1993 |
| JP | 5-194611 | 8/1993 |
| JP | 5-255412 | 10/1993 |
| JP | 2001-508099 A | 6/2001 |
| JP | 2010-515796 | 5/2010 |
| WO | WO 90/15659 A1 | 12/1990 |
| WO | WO 98/30598 A1 | 7/1998 |
| WO | WO 00/76624 A2 | 12/2000 |
| WO | WO 02/49756 A1 | 6/2002 |
| WO | WO 03/066190 A1 | 8/2003 |

OTHER PUBLICATIONS

International Search Report and Written Opinion dated Oct. 13, 2014 in PCT/EP2014/066251 filed Jul. 29, 2014 in PCT/EP214/066251.
Membrane Separation Processes, Coulson and Richardson's Chemicals Engineering, Fifth Edition, vol. 2, 2002, 18, pp. 437-454.
Korean Office Action dated Dec. 29, 2016 in Patent Application No. 10-2016-7004782 (with English Translation).
Third Party Observation issued Dec. 2, 2015 in PCT/EP2014/066251.
Ray Bertera et al. "Development Studies of Crossflow Microfiltration", The Chemical Engineer, vol. 404, Jun. 1984, pp. 10-14.
Combined Office Action and Search Report dated Oct. 11, 2016 in Chinese Patent Application No. 21480054362.7 (with English translation and English translation of category of cited documents).
Yan Xikang, et al., Biological Material Separation Engineering, Chemical Industry Press, Apr. 2010, pp. 41-42 (with English translation of relevant part).
U.S. Appl. No. 14/908,925, filed Jan. 29, 2016.
U.S. Appl. No. 14/908,872, filed Jan. 29, 2016.

* cited by examiner

REVERSE-PHASE POLYMERISATION PROCESS

The present invention relates to a process for the preparation of polymers by reverse-phase suspension polymerisation which incorporates a cleaning stage for the liquid suspending medium. The process involves the polymerisation of water-soluble ethylenically unsaturated monomers by a reverse-phase suspension polymerisation process to form polymeric beads.

It is known to manufacture water-soluble or water swellable polymer beads by reverse-phase polymerisation. Reverse-phase polymerisation processes comprise forming droplets of an aqueous solution of water-soluble ethylenically unsaturated monomer or monomer blend and polymerising the monomer or monomer blend, while the droplets are suspended in a non-aqueous liquid, to form aqueous polymer droplets. Where the monomer or monomer blend is formed into an emulsion or microemulsion in the continuous phase of non-aqueous liquid the resulting products would be reverse-phase emulsions or microemulsions of the polymer. In the case where the droplets of monomer or monomer blend are not emulsified into the non-aqueous liquid resulting polymer would be in the form of beads. Generally the droplet size of such beads would be larger than for emulsions or microemulsions. Typically such reverse-phase processes for making polymer beads are referred to as reverse-phase suspension polymerisation processes. If the droplets are beads, the polymerisation process is generally completed by drying the resultant polymer beads and separating the polymer beads from the non-aqueous liquid.

The usual way of performing a reverse-phase suspension polymerisation process comprises charging a reaction vessel with non-aqueous liquid and dispersing the aqueous monomer or monomer blend in bulk into the non-aqueous liquid with sufficient agitation to form the aqueous monomer beads suspended in the non-aqueous liquid. The resultant particle size distribution tends to be much narrower, and the amount of fines tends to be much less than when the polymer is made by the widely used gel polymerisation process which would require comminution, drying and grinding.

EP 952989 describes a process of manufacturing polymer beads in which an aqueous solution of water-soluble ethylenically unsaturated monomer or monomer blend in the presence of an initiator is extruded through orifices into a column of non-aqueous liquid as monomer beads. The column of non-aqueous liquid flows counter current to the descending aqueous monomer beads in order to slow their descent. This process provides polymer beads with a much narrower particle size distribution that the aforementioned methods employing a reaction vessel with agitation.

In commercial scale processes the non-aqueous liquid from a reverse-phase suspension polymerisation process is normally recycled for further use as a suspending medium. However, once the non-aqueous liquid has been used in such reverse-phase suspension polymerisation processes it will normally contain impurities. Such impurities may be derived from very fine particles of the polymer, often termed polymer fines, or stabiliser materials such as protective colloids or polymeric amphipathic stabilisers or low molecular weight impurities which refer to for instance molecular species that remain in the non-aqueous liquid, such as initiators, inhibitors, chain-transfer agents, and byproducts such as compounds resulting from the decomposition of active compounds such as initiators or chain transfer agents. In some cases the impurities may be as a result of other additives. The macromolecular impurities may include dissolved materials, for instance dissolved stabiliser, but mostly these impurities take the form of solid particles which are often microscopic, for instance exhibiting particle sizes less than 100 µm and often less than 50 µm. Such impurities if present in the non-aqueous liquid employed in a suspension polymerisation process can lead to adverse effects on the polymerisation process. This may for instance result in a reduced stability of the polymerising monomer beads and/or result in inferior polymer products. In addition such impurities can hinder some of the necessary non-aqueous cleaning steps. Therefore it is generally standard practice to remove fines from the non-aqueous liquid before recycling.

A typical way to clean the non-aqueous liquid is to subject all of the non-aqueous liquid to an evaporation step in which the non-aqueous liquid is evaporated leaving behind most of the impurities followed by condensing. Typically such evaporation steps employ wiped film evaporation.

One disadvantage of evaporation of all of the non-aqueous liquid is that it requires high temperatures which might lead to solvent quality deterioration due to undesirable side reactions and accumulation of high boilers. In addition, there is a risk that the smallest particles (nm range) will be carried over to the next step with the vapor (vacuum that is applied to evaporate solvent is able to also pull fines with the vapor). Furthermore, evaporation of entire amount of non-aqueous liquid and subsequent condensation requires significant levels of energy and as such is very costly.

One other possible way to clean the non-aqueous liquid is by centrifugation. However, the polymerisation processes tend to generate fine impurities which are in submicron region (both polymer and stabilizer). Nevertheless, centrifugation is not efficient enough in a submicron region to provide high purity cleaned non-aqueous liquids and therefore would not be sufficiently efficient for adequately cleaning non-aqueous liquids which have been used in reverse-phase suspension polymerisation processes.

Furthermore, the non-aqueous liquid can be degraded due to side reactions occurring when the liquid is evaporated at high temperatures. Therefore the non-aqueous liquid tends to have a limited life of recycling before it is necessary to replenish it with new non-aqueous liquid. In addition, even when the non-aqueous liquid is recycled once or very few times, many impurities still remain which can impair the reverse-phase suspension polymerisation process and lead to reduced product quality.

Therefore it would be desirable to provide a more efficient process of reverse-phase suspension polymerisation to provide water-soluble or water swellable polymer beads of high-quality which can be carried out on a commercial scale. In particular it would be desirable to provide a process which enables polymers beads of particular molecular weight and/or water solubility to be prepared more consistently.

According to the present invention we provide a reverse-phase suspension polymerisation process for the manufacture of polymer beads comprising forming aqueous monomer beads comprising an aqueous solution of water-soluble ethylenically unsaturated monomer or monomer blend and polymerising the monomer or monomer blend to form aqueous polymer beads while suspended in a non-aqueous liquid, recovering polymer beads, and then cleaning the non-aqueous liquid in which the process comprises providing the non-aqueous liquid in a vessel (1), forming a suspension of monomer beads from the aqueous monomer or monomer blend in the non-aqueous liquid, initiating polymerisation to form polymerising beads, removing a suspension of the polymer beads in non-aqueous liquid from the vessel and recovering, water soluble or water swellable polymer beads from the suspension, in which the non-aqueous liquid contains impurities which comprise particles, and then transferring the non-aqueous liquid from the suspension to a cleaning stage, in which the cleaning stage provides a cleaned non-aqueous liquid suitable for use in a reverse-phase suspension polymerisation process, which cleaning stage comprises removing particles from the non-aqueous liquid in at least one filtration step.

The invention also provides an apparatus suitable for a reverse-phase suspension polymerisation process for the manufacture of polymer beads from an aqueous solution comprising water-soluble ethylenically unsaturated monomer or monomer blend, in which the apparatus comprises a vessel (1) which is suitable for containing a non-aqueous liquid, a means for forming a suspension of aqueous monomer beads in the non-aqueous liquid, a means for removing a suspension of the polymer beads in the non-aqueous liquid from the vessel, a means for recovering water-soluble or water swellable polymer beads from the suspension, a means for cleaning the non-aqueous liquid by at least one filtration step, such that the cleaned non-aqueous liquid is suitable for use in a reverse phase polymerisation process.

The inventors have found that the process and the apparatus achieve the aforementioned objectives.

By bead we mean a globular or otherwise round object. The beads may be substantially spherical or even elliptical. However, it is preferred that the beads are substantially spherical.

In a preferred process of the invention the polymer which is obtained is water-soluble. Generally this is made by conducting the polymerisation in the absence of added cross-linker. Accordingly, the process is particularly valuable for the manufacture of polymeric flocculants and viscosifiers.

In other processes the beads can be swellable in water rather than water-soluble. For instance the beads can be cross-linked by polymerising the monomer or monomer blend in the presence of added cross-linking agent. The amount of cross-linking agent can be selected between the values which are relatively low and values which are high. For instance the amount of cross-linking agent can be 100 to 500 ppm up to 1000 to 2000 ppm or more based on weight of cross-linking agent on weight of monomer.

However, in some cases it may be desirable to produce water-soluble polymers by the inclusion of small amount of added cross-linking agent, for instance up to 10 ppm of cross-linking agent based on total polymer, such as up to 8 ppm, for up to 6 ppm or up to 5 ppm; this may be at least 0.1 ppm or at least 0.5 ppm or at least 1 ppm or at least 2 ppm.

The cross-linking agent may be a compound which reacts with pendant groups of monomer units or polymer chain, for instance multi valent metal salts where the monomer or polymer carries a carboxylic acid group. Preferably the cross-linking agent may be a polyethylenically unsaturated compound i.e. a compound with at least two ethylenically unsaturated moieties. Suitably the cross-linking agent may be methylenebisacrylamide, tetra allyl ammonium chloride, polyethylene glycol diacrylate etc.

The process of the invention may be carried out in batch mode with a single batch of aqueous monomer or monomer blend being polymerized to form a batch of water-soluble or water swellable polymer beads. In this case following the polymerisation the non-aqueous liquid would be subjected to the cleaning stage and the resulting cleaned non-aqueous liquid may be used in a subsequent reverse phase suspension polymerization.

Preferably the process of the invention is continuous and the cleaned non-aqueous liquid is recycled back into the reverse-phase suspension polymerisation process. This may be achieved by a suitable continuous suspension polymerisation in which aqueous monomer or monomer blend is continuously introduced into the process and formed into monomer beads suspended in the non-aqueous liquid with the formation of the polymer beads which can be recovered continuously. The non-aqueous liquid which would be separated from the recovered polymer beads can be fed into the cleaning stage and the cleaned non-aqueous liquid continuously recycled to the beginning of the polymerisation step. Thus according to a preferred aspect of the present invention the non-aqueous liquid in which the suspension of monomer beads is formed comprises cleaned non-aqueous liquid in which the cleaned non-aqueous liquid has been recycled from the process of the present invention. It may be desirable that the non-aqueous liquid in which the suspension of monomer beads is formed comprises a blend of new or virgin non-aqueous liquid and cleaned non-aqueous liquid recycled from the process of the present invention. Indeed it may be desirable that a continuous process is started employing new or virgin non-aqueous liquid and that as the continuous process proceeds cleaned non-aqueous liquid is recycled into the process.

In the process aqueous monomer or monomer blend typically may be combined with the non-aqueous liquid and formed into monomer beads suspended in the non-aqueous liquid. Suitably this can be achieved in a vessel which contains sufficient agitation so as to disperse the aqueous monomer as droplets which remain substantially stable. In such a process the aqueous monomer is generally added to the non-aqueous liquid relatively slowly in order to allow the aqueous monomer to be formed into the desired droplets or monomer beads. Desirably such a process can be carried out in a vessel containing a rotating rod bearing impellers often termed a stirrer or agitator.

In one preferred way of carrying out the polymerisation the non-aqueous liquid may be provided as volume (2) in the vessel (1), which volume extends between a polymer bead discharge point (3) and a monomer feed point (4). The aqueous monomer or monomer blend desirably may be fed or extruded as aqueous monomer beads through orifices (5) to form aqueous monomer beads, allowing the aqueous monomer beads to flow towards the polymer bead discharge point, initiating polymerisation to form polymerising beads.

Suitably the polymerising beads have formed polymer beads when they reach the polymer bead discharge point. Generally the polymer beads should be removed from the vessel as a suspension in the nonaqueous liquid through the polymer discharge point.

The polymer beads removed at the polymer bead discharge point may still be polymerising. However, said polymer beads should desirably be essentially non-coalescent by the time they reach the polymer bead discharge point. By non-coalescent we mean that the beads have a tendency not to stick together to form agglomerates. The polymer beads removed at the polymer bead discharge point may comprise mainly polymer, generally at least 80% polymer and typically at least 90% polymer the remainder of which is formed from monomer and/or other oligomeric or polymerisable species. In some cases the polymer beads removed at the polymer bead discharge point may be substantially fully polymerized with only low residual monomer, for instance less than 2% or below.

Typically the polymer beads removed at the polymer bead discharge point tend to be still polymerising. In this case it is preferred that the suspension of polymer beads removed at the polymer bead discharge point is subjected to a post polymerisation stage. Such a post polymerisation stage may be carried out in a separate vessel optionally using additional initiator systems. Optionally the post polymerisation stage may involve irradiating the polymer beads with ultraviolet light and/or subjecting the polymer beads to thermal energy.

The aqueous monomer beads are formed from an aqueous solution comprising water-soluble ethylenically unsaturated monomer or monomer blend. The aqueous solution may consist of dissolved monomer, water and optionally other ingredients such as polymerisation catalysts, for instance polymerisation initiators. Generally the aqueous solution of the monomer or blend of monomers may be at a concentration of up to 75% by weight of the monomer dissolved in water. Usually the concentration of the monomer or monomer blend in the aqueous solution will be less than this, for instance up to 60% or up to 55% or up to 50% by weight. Suitably the concentration of the monomer in the aqueous monomer or monomer blend should be at least 10%, typically at least 20% and usually at least 25% or at least 30%.

It may be desirable for the aqueous monomer or monomer blend to also contain at least one polymer which is suitably dissolved in it. Thus the aqueous monomer beads may comprise dissolved monomer or monomer blend in addition to at least one dissolved polymer. Suitably the at least one polymer is a solution of the same polymer type as the polymer formed in the present process. For instance if the aqueous monomer comprises acrylamide with other comonomers the at least one polymer may be a polymer of acrylamide with the same other comonomers. Alternatively the at least one polymer should be compatible with the aqueous monomer or monomer blend. Suitably the amount of polymer present in the aqueous monomer or monomer blend may be up to 120% of the dry weight of monomer or monomer blend. Typically, where at least one polymer is present the amount will be less than this, for instance up to 100% of the dry weight of the monomer or monomer blend and usually no more than 80%, desirably no more than 60%. Where the at least one polymer is present in the aqueous monomer or monomer blend it may be in an amount which is quite small, for instance at least 0.05% and suitably at least 0.1%, often at least 0.5%, for instance at least 1.0%. The amount of at least one polymer contained in the aqueous monomer or monomer blend may depend upon the desired properties and also the molar mass of the at least one polymer. It may be desirable to employ at least one polymer in the monomer or monomer blend so as to alter the rheological properties of the aqueous monomer or monomer blend and hence the rheological properties of the aqueous monomer beads. In some cases the presence of the at least one polymer may viscosify the aqueous monomer or monomer blend which may reduce the ability of the aqueous monomer beads to deform and/or coalesce. Preferably, however, the aqueous monomer or monomer blend which is fed or extruded and the so formed aqueous monomer beads do not contain polymer. In the vessel the direction of flow should be in a downwards direction when the polymer bead discharge point is below the monomer feed point. It is preferred that the direction of flow is downwards.

Suitably the aqueous monomer or monomer blend may be fed or extruded into or onto the non-aqueous liquid. The aqueous monomer or monomer blend can be fed or extruded such that individual monomer beads having a desired size are formed. Where the aqueous monomer or monomer blend is fed or extruded onto the non-aqueous liquid desirably this should be done not shatteringly onto the non-aqueous liquid. By this we mean that the monomer bead does not break upon contact with the non-aqueous liquid.

Desirably the aqueous monomer or monomer blend may be degassed in order to remove oxygen which may otherwise inhibit the polymerisation reaction. In general, this should be done prior to feeding the aqueous monomer or monomer blend through the orifices.

Suitably the degassing of the aqueous monomer or monomer blend may be achieved by mixing it with nitrogen in a mixer. Subsequently the mixture of the aqueous monomer or monomer blend and nitrogen may be flowed into a degassing column. Specifically a thin film of the aqueous mixture can be formed on the walls of the degassing column, from which the nitrogen and any entrained oxygen can be released into the offgas and/or monomer or monomer blend. Suitably the degassing column walls may be constructed of glass or at least have a glass lining. The degree of deoxygenation can be monitored by detecting the amount of oxygen in the offgas using an oxygen sensor. The amount of nitrogen mixed in the aforementioned mixture can then be adjusted as appropriate. The degassing may be carried out according to the teachings of WO 03/066190.

By feeding the aqueous monomer or monomer blend through the orifices this may also be regarded as extruding. Such an extrusion of the monomer may tend to form a stream of monomer liquid and/or monomer beads. Where a stream of monomer is formed the stream may then break into individual monomer beads In this preferred aspect when the direction of flow is in a downwards direction the aqueous monomer beads desirably should fall gradually and independently through the non-aqueous liquid. The descending aqueous monomer beads suitably may be initiated by subjecting to polymerisation conditions in order to induce polymerisation.

Suitably the non-aqueous liquid may be admitted to the vessel by any suitable means, for instance an inlet port.

The non-aqueous liquid may be flowing in an upward direction or alternatively in a downward direction or in some cases it may be desirable for the non-aqueous liquid to be substantially non-flowing. When the non-aqueous liquid is substantially non-flowing suitably it may be essentially stationary and non-agitated. Desirably any movement of the non-aqueous liquid should be substantially non-disruptive to the monomer beads or the polymerising beads.

Thus when the non-aqueous liquid is flowing either in an upward direction or in a downward direction desirably it should be substantially non-disruptive. By this we mean that the flow of non-aqueous liquid does not disrupt the individual integrity of the monomer beads which are descending through the column of non-aqueous liquid. Therefore the flow should be sufficiently non-turbulent that it does not cause unacceptable collisions of the monomer beads or polymerising beads especially while they are sticky and falling through the column of non-aqueous liquid. The flow should be sufficiently non-disruptive such that it does not cause shearing of the beads into small particles while they are flowing down through the column. Conveniently therefore the flow can be considered to be substantially non-turbulent. In some cases it may be desirable that the flow is sufficiently non-turbulent (that is substantially laminar flow) . However, there can still be a small amount of non-laminar flow within the non-aqueous liquid due to convection effects with the consequential formation of swirls or eddies. Generally these can be tolerated provided that the collisions between the aqueous monomer beads and/or polymerising beads are avoided within an acceptable level. In general the beads which are flowing through the non-aqueous liquid will follow a substantially rectilinear downward or upward path and will not encounter forces having a sufficient transverse component as to promote significant coalescence of the beads as they flow.

The volume of non-aqueous liquid may be formed in a suitable vessel. Suitably the volume of non-aqueous liquid may be in the form of a column which extends between the polymer bead discharge point and the monomer feed point. Typically the volume or column of non-aqueous liquid may have a cross-sectional diameter which is less than the height. Nevertheless, it may be desirable in some instant studies for the cross-sectional diameter to be the same or greater than the height.

In general the volume of column of non-aqueous liquid is usually wholly vertical but it can be slightly inclined provided the flow profile is such that the beads do not significantly impact on to and coalesce against the walls of the vessel.

The column may be formed in any suitable upright vessel which may for instance be a tubular substantially vertical reaction vessel. The vessel should be free of baffles or other turbulence introducing features. Preferably the walls of the vessel are substantially smooth and parallel or taper outwardly or inwardly at an angle which is sufficiently low to avoid promoting turbulence.

The flow rate of the non-aqueous liquid, whether in a upwards direction or a downwards direction, may be adjusted in such a way to control the rate of descent of the beads to a period which is within the range of about 0.5 or 1 min to about 30 min and which is sufficient (having regard to the initiator and other polymerisation conditions) for the beads to be substantially non-coalescent when they reach the base of the column. By non-coalescent we mean that the beads have a tendency not to stick together to form agglomerates.

When the polymerising beads are descending the rate of flow may be such that the duration of the descent of beads is at least about 0.5 min, and usually at least 1 min. In general, depending upon the rate of polymerisation, this may be required to ensure that sufficient time is given for the polymerisation to proceed sufficiently, before the beads reach the base of the vessel, or the beads to be substantially non-coalescent by the time they reach the base of the vessel. Furthermore it may be desirable to conduct the process using a polymerisation which takes a significant time to go to completion, rather than a polymerisation which achieves near completion, within a few seconds. This is because, as a generality, improved polymer properties tend to be obtained with slower polymerizations than with quicker polymerizations, especially when making high molecular weight water-soluble polymers or other useful polymers in accordance with this invention. In general, if the duration of fall is, for instance significantly less than about 0.5 min then it is likely that either significant coalescence may occur at the base of the vessel or that the polymerisation may have to be arranged to progress so rapidly as to risk producing an inferior polymer, or both.

The size of the polymer beads which are ultimately formed will be determined generally as a result of the choice of monomer feeding or extrusion conditions (for instance the size of the orifices. In addition the polymer bead size may be influenced by how the monomer beads are introduced into the non-aqueous liquid. Preferably the avoidance of shattering of the beads into or closely onto the non-aqueous liquid may avoid undesirable variations to the particle size. Further, it is preferred that where the non-aqueous liquid is flowing either upwards or downwards that the flow is substantially non-turbulent which may risk undesirable collisions and/or coalescence of the monomer beads or polymerising beads.

The size of the aqueous monomer beads is selected so as to provide final polymer beads of whatever size is desired, for instance having a weight average size in the range 30 μm to 3 mm, and often between 0.1 mm and 2 mm. Usually all the orifices are substantially the same size and usually all discharge from the single supply chamber, and thus all discharge under the same pressure. In some cases, particularly where a relatively large number of orifices are employed, it may be desirable to use multiple supply chambers. Alternatively a single supply chamber may be employed which has several inlets into it. Generally the discharge pressure should be substantially the same for all of the orifices even where multiple supply chambers are employed. Accordingly the initial aqueous monomer beads are preferably all substantially the same size. In general, the ejected aqueous monomer beads are usually as uniform as possible, for instance at least 90% by weight within 15 to 30% of the weight average size. Often the size distribution is significantly less than this, for instance as discussed in more detail below.

It is generally preferred that the orifices are located at the surface or beneath the surface of the non-aqueous liquid, i.e., so that the monomer beads are fed or extruded directly from the orifices into the non-aqueous liquid. Feeding or extrusion from orifices above the non-aqueous liquid can, however, be tolerated provided the drop distance is sufficiently small that the beads of monomer do not shatter or otherwise significantly distort when they impact on the surface of the non-aqueous liquid. Typically, the orifices should not be located more than 20 mm, and preferably not more than 10 mm, above the surface of the non-aqueous liquid. Nevertheless, in some instances it may be desirable for the feeding or extrusion orifices to be located more than 20 mm above the surface of the non-aqueous liquid.

In the preferred process where the direction of flow of the monomer beads is downwards the monomer beads desirably should be introduced into the volume or column of non-aqueous liquid at the monomer feed point which is at or near the top of the volume or column of non-aqueous liquid. Non-aqueous liquid may be above the monomer feed point, for instance as a result of a monomer bead extrusion device being provided in the centre of the upright vessel and non-aqueous liquid being located around it. Often, however, the monomer feed point is at the top of the column in that when the non-aqueous liquid is not flowing the top of the column is the highest point of the non-aqueous liquid or when the non-aqueous liquid is upflowing this is the point at which the non-aqueous liquid is deflected from a substantially vertical flow to a horizontal flow or other direction which allows it to be removed from the vessel or when the non-aqueous liquid is down flowing this is the point at which the non-aqueous liquid flows from a horizontal or other direction and then starts to flow substantially vertically downwards which in general allows the non-aqueous liquid to enter the vessel. In many situations the monomer feed point may represent the highest point of the column of non-aqueous liquid in the vessel and generally this may be irrespective of whether the non-aqueous liquid is flowing or substantially non-flowing.

In the particular case when the direction of flow is downwards the discharge of the aqueous monomer beads into or onto the non-aqueous liquid may be at this monomer feed point or it may be at some position distant from it provided that position is above and is in sufficiently close and substantially non-disruptive non-aqueous liquid communication with the monomer feed point. Thus the monomer feed point may be a point at which the volume or column of non-aqueous liquid is deflected laterally when flowing upwards or flows from a lateral direction and then deflected substantially vertically when flowing downwards and in both instances there can be a short vertical column above this in which little or no up flow or down flowing occurs but down which the beads can fall through non-aqueous liquid in a substantially non-turbulent manner without coalescence.

More preferably the non-aqueous liquid flows in a downwards direction i.e. co-current with the direction of flow of the monomer beads. This has been found to be particularly advantageous when the aqueous monomer or monomer blend is fed or extruded into the non-aqueous liquid.

The feeding or extrusion of the aqueous monomer or monomer blend as monomer beads through orifices may be conducted in any suitable manner for forming a plurality of beads of predetermined size from a fluid liquid. The orifices generally have a diameter in the range 0.05 to 2 mm. There may be a plurality of extrusion needles each of which is provided with a pulsed supply of liquid or there may be a perforated grid/plate provided with a pulsed supply of liquid.

Desirably the orifices are disposed in at least one plate or at least one grid. Therefore the process may employ a multiplicity of orifice containing plates and/or orifice containing grids. Preferably one plate or one grid is employed. More preferably a single plate is employed in which a plurality of orifices is disposed.

Preferably the orifices may be comprised in a droplet generation head. The droplet generation head may be so adapted as to deliver a pulsated flow of aqueous monomer or monomer blend.

The frequency of the pulsations may be between 100 and 1000 Hz, for instance from 300 to 750 Hz. Therefore the flow of monomer through the orifices may be subjected to pulsed variations in pressure. For instance, part of the chamber may be defined by a diaphragm which is caused to vibrate at the desired frequency, for instance by means of electromagnetic vibration or using a piezoelectric device. However, preferably the droplet generation head is so adapted as to deliver a constant flow of aqueous monomer or monomer blend i.e. not subject to a pulsated flow or pressure variations.

Preferably the chamber of the droplet generation head acts as a reservoir to enable a constant flow of the aqueous monomer or monomer blend to pass through all of the orifices contained in the plate or grid at a substantially constant pressure. The inner chamber also reduces or eliminates any pressure variations resulting from pumping or otherwise feeding of the monomer. Thus the inner chamber has a dampening effect on the pressure fluctuations of monomer being delivered to the orifices.

Suitably the whole orifice containing plate or whole orifice containing grid is vibrated in accordance with the present invention. Where the orifices are held in a plate which is part of a droplet generation head, the plate may be caused to vibrate or preferably the whole droplet generation head containing the plate may be caused to vibrate.

The process may be facilitated by the presence of suitable stabilisers or protective colloids which may help to prevent coalescence of the monomer beads or polymerising beads. The stabilisers or protective colloids may be surfactants or polymeric materials conventionally used for making polymer beads by reverse-phase suspension polymerisation. Generally the stabiliser may be an amphipathic stabiliser. Preferably the process is facilitated by the presence of amphipathic polymeric stabiliser in the non-aqueous liquid. The amount can be less than the amount which is normally required for a conventional suspension polymerisation and the amount of active polymeric stabiliser may generally be at least 0.01% based on the weight of non-aqueous liquid, for instance at least 0.05% or at least 0.1% and in some cases at least 0.3% or at least 0.5% or at least 1.0%. The amount of active polymeric stabiliser may be as much as 10% based on the weight of non-aqueous liquid, for instance up to 5.0% or up to 2.0%. In some cases it may be up to 1.0% or up to 1.0% or up to 0.5%. Suitable polymeric stabilisers are copolymers of water-soluble ethylenically unsaturated monomers, such as methacrylic or acrylic acid or dialkyl amino alkyl(meth)acrylate salt, and water insoluble ethylenically unsaturated monomers such as styrene and/or fatty alkyl acrylates or methacrylates. Block copolymers (including multiblock copolymers, such as diblock or triblock copolymers) such as the copolymer of polyethylene glycol and hydroxy stearic acid can be used, all as is conventional for reverse-phase suspension polymerisation of water-soluble monomers to provide polymer beads of water-soluble or water swellable polymers.

The non-aqueous liquid can be any conventional hydrocarbon or other non-aqueous liquid such as any of those known for use in reverse phase polymerizations. For instance, it may be an aliphatic, cycloaliphatic or aromatic hydrocarbon, typically having a boiling point of between 140° C. and 350° C. Suitable non-aqueous liquids include D40, D80, D100, Isopar G, or Isopar by companies such as Exxon Mobil, Shell Chemicals or others. When the process employs a photo polymerisation technique the non-aqueous liquid should be chosen so as to allow the passage of the appropriate wavelengths of radiation. Thus when a UV polymerisation process is employed the non-aqueous liquid chosen should allow the passage of UV light at least in the appropriate wavelengths chosen for the polymerisation.

The time required for the monomer beads to polymerize sufficiently that they become non-coalescent, while still dispersed in the non-aqueous liquid, is dictated by the choice of the monomer or blend of monomers, the initiator system and the polymerisation conditions in the vessel, such as the choice of initiators, temperature, and in the case of photo polymerisation, the wave length of the light such as ultraviolet light and the intensity.

The rate of descent or assent of the beads (i.e. as monomer beads and polymerising beads), and thus their times of travel, depends on the size and composition of the beads, the rate and direction of flow, and the choice of flowing liquid (for instance, viscosity and especially the differential between the specific gravities of the beads and the liquid. Viscosifier can be included to increase the viscosity of the non-aqueous liquid but this is usually avoided.

As to whether or not the column of non-aqueous liquid is substantially static or flowing and if so the rate of upward flow or downward flow will depend upon the relative specific gravities of the aqueous monomer beads and the polymerisation conditions and desirably should be selected in a known manner such that the monomer beads polymerize to a substantially non-coalescent state before they reach the bottom of the column. As already stated it is preferred that the column of non-aqueous liquid flows in a downward direction i.e. co-current with the direction of flow of the monomer beads.

Preferably the period of time for the monomer beads to reach the bottom of the column as non-coalescent polymer beads should be not more than 30 min and preferably not more than 20 min and is usually not more than 10 min. Preferably the period is at least 10 seconds and often at least 30 seconds and usually may be within the range of between 1 or 2 min and 5 or 10 min. In many cases it may be considered undesirable to polymerize too quickly, since this may impact on the final molecular weight of the polymer beads. Therefore it is normally preferred to polymerize for at least 10 seconds before the polymer beads become non-coalescent and frequently the polymerisation may need to be conducted for at least 20 seconds or 30 seconds before the non-coalescent state is achieved.

It may be desirable that there is a substantially static column of non-aqueous liquid down through which the beads fall before reaching the column of flowing non-aqueous liquid. This static column of non-aqueous liquid may occupy a few seconds, for instance up to 10 or even 20 seconds or more in some processes, and so this will add to the total polymerisation time. Preferably however, such a static column of non-aqueous liquid is not employed.

The process of the present invention may employ any of the conventional polymerisation techniques, such as redox initiated polymerisation, photo polymerisation or thermal polymerisation or combination of two or more initiation techniques. For instance, it may be desirable to employ a combination of redox initiation and photo initiation, for instance UV initiation or for instance either redox initiation and/or photo initiation in combination with thermal initiation.

It may be desirable for the process to employ a thermal polymerisation technique. Such thermal polymerisation techniques and suitable initiators are well documented in the literature. Typically the initiators suitable for thermal polymerisation form radicals at a given temperature. Suitable initiators include azo compounds, such as those mentioned previously. However, thermal polymerisation techniques often require that the temperature of initiation is at least 40 or 50° C. or more.

Therefore polymerisation techniques which enable the polymerisation to be started at much lower temperatures are preferred.

Any suitable initiator can be used. The initiator can be, for example, a peroxide, a persulfate, an azo compound, a sulfate, a redox couple or mixtures thereof.

Examples of peroxides are hydrogen peroxide, potassium peroxide, tert-butyl peroxide, tert-butyl hydroperoxide, cumene hydroperoxide and benzoyl peroxide. Examples of persulfates are ammonium, sodium or potassium persulfate. Examples of azo compounds are 2,2-azobisisobutyronitrile, 4,4'-azobis(4-cyanovaleric acid) and 2,2'-azobis(N,N'-dimethyleneisobutyramidine)dihydrochloride, 1,1'-azobis(cyclohexanecarbonitrile) and 2,2'-azobis(2-amidinopropane) dihydrochloride. Examples of sulfates are ferrous ammonium sulfate and ammonium sulfate. Redox couples consist of an oxidizing agent and a reducing agent. The oxidizing agent can be one of the above listed peroxides, persulfates, sulfates or azo compounds, or an alkali metal chlorate or bromate. Examples of alkali metals are given above. Examples of reducing agents are ascorbic acid, glucose or ammonium or alkali metal hydrogen sulfite, sulfite, thiosulfate or sulfide, or ferrous ammonium sulfate.

Suitably, the initiator may be a mixture of a redox couple with one or more initiators selected from the group consisting of peroxides, persulfates and azo compounds.

More suitably, the initiator may be a mixture of a redox couple, wherein the oxidizing agent is selected from the group consisting of peroxides and alkali metal bromates, and the reducing agent is selected from the group consisting of ammonium or alkali metal hydrogen sulfite, sulfite, thiosulfate or sulfide, or ferrous ammonium sulfate, with one or more azo compound initiators.

Even more suitably, the initiator may be a mixture of a redox couple, wherein the oxidizing agent is selected from the group consisting of hydrogen peroxides and alkali metal bromates, and the reducing agent is an alkali metal hydrogen sulfite or sulfite, with one or more azo compound initiators.

Desirably, the initiator is a mixture of a redox couple, wherein the oxidizing agent is selected from the group consisting of tert-butylhydroperoxide and potassium bromate, and the reducing agent is sodium sulfite, with one or more azo compound initiators selected from the group consisting of 2,2-azobisisobutyronitrile, 4,4'-azobis(4-cyanovaleric acid) and 2,2'-azobis(N,N'-dimethyleneisobutyramidine).

A preferred polymerisation technique employs electromagnetic radiation or actinic radiation in combination with suitable photo initiators. More preferably the polymerisation technique employs ultraviolet radiation in combination with suitable UV photo initiators.

Suitably the light source may be in communication with an external surface of a transparent portion of the vessel. Preferably the light source is mounted at a distance of up to 10 cm from the external transparent surface of the vessel, more preferably within a range of 0.1 and 5.0 cm. The transparent portion of the vessel may be formed from a suitable material which is substantially transparent to UV light. For instance, this material may be glass or plastic. Alternatively, the UV light source maybe mounted inside the reactor vessel.

Preferably, the UV radiation is UVA radiation, particularly with a frequency of 340 to 380 nm, for instance between 360 and 370 nm.

The intensity of the actinic radiation, for instance UV light, may be in the range of 5 to 1000 mW/cm$^2$, desirably 10 to 1000 mW/cm$^2$, for instance within the range of 30 to 100 mW/cm$^2$.

The vessel in which the process is conducted may be any convenient shape and size which allows the monomer beads to descend through the non-aqueous liquid such that suitably non-coalescent polymer beads are formed. It may be desirable for the vessel to have flat wall or walls and for instance comprise a horizontal cross-section which is triangular, square, rectangular, or other polygonal shape such as pentagonal, hexagonal, heptagonal or octagonal etc. Alternatively, it may be desirable for the vessel to have curved wall or walls and for instance comprise a horizontal cross-section which is circular, elliptical or oval etc.

It may also be desirable for the vessel to comprise a further wall or set of walls within the boundary defined by a first wall or walls. Thus the vessel may comprise an outer wall or walls and an inner wall or walls and which the non-aqueous liquid is contained in the space between the outer wall or walls and the inner wall or walls. Preferably the vessel comprises an outer circular wall or walls and an inner circular wall or walls and the horizontal cross-section defines two concentric circles with an annular gap between the inner wall or walls and the outer wall or walls. In this preferred form of the process the non-aqueous liquid is contained in the annular gap which is defined by the inner wall or walls and the outer wall or walls. In one form of this preferred aspect of the invention the UV source is located external to the outer wall. In a further form the UV source is located external to the inner wall. In both scenarios the UV source would be located external to the reaction medium. It may also be desirable for the UV source to be located external to both the inner wall and outer wall.

The vessel may be of any suitable dimensions. Typically the vessel may have a height of up to 25 m or more but is usually no more than 20 m, for instance up to 15 m for up to 10 m. Suitably the vessel may have a height of at least 2 m and usually more, for instance at least 3 m or at least 5 m. Suitably the cross-section of the vessel may be up to 5 m or more but is usually no more than 3 m in diameter. Usually the cross-section of the vessel should be at least 0.25 m and often may be at least 0.5 m, for instance at least 1.0 m or at least 1.5 m. Where the cross-sectional diameter is different across perpendicular planes, for instance in the case of a vessel which has a rectangular cross-section, the two cross-sectional diameters may for instance be chosen from any value within the aforesaid range given in regard to the cross-sectional diameter. Where the vessel consists of two concentric cylinders, the cross-sectional diameter of the inner cylinder may be at least 0.1 m, for instance at least 0.2 m or at least 0.5 m. The inner cylinder may have a cross-sectional diameter much larger than this provided that it is less than the outer concentric cylinder and allow sufficient volume between the two cylinders to enable the process to be conducted. In general the inner concentric cylinder may have a cross-sectional diameter of up to 4.5 m, for instance up to 4 m or even up to 3.5 m, such as no more than 3 m. Suitably the cross-sectional diameter of the inner cylinder may be between 0.5 m and 2.5 m, for instance between 0.6 m and 2.0 m, such as between 0.7 m and 1.2 m. Desirably the outer concentric cylinder should have a cross-sectional diameter which is up to 3 m greater than the cross-sectional diameter of the inner cylinder, for instance up to 2.5 m or up to 2 m. Often the outer concentric cylinder may have a cross-sectional diameter which is at least 0.05 m greater than that of the inner cylinder, for instance at least 0.1 m greater.

The process and apparatus of the present invention may comprise a single vessel. Nevertheless it may be desirable to employ a multiplicity of vessels connected in parallel. In such cases the number of vessels employed may depend upon the quantity of polymer beads to be prepared simultaneously. For instance, it may be desirable to employ up to 30 vessels or more in parallel. Typically the number of vessels may be up to 20 or 25 vessels, for instance up to 15 vessels. Where a multiplicity of vessels are employed the number of vessels may be at least 2 or more, for instance at least 3 vessels or at least 5 vessels in parallel.

Where a multiplicity of vessels (1) are used in the apparatus of the present invention in may be desirable for the polymer beads discharged from the polymer be discharge point of all or some of the vessels (1) to be directed into a single post-polymerisation vessel. Nevertheless it may be desirable that the polymer beads discharged from the multiplicity of vessels (1) are fed into two or more post-polymerisation vessels connected in parallel.

The vessel may be constructed of at least one corrosion stable material, for instance alloy steels containing nickel, chromium, molybdenum, vanadium, silicon already combinations thereof or glass etc. The vessel may be constructive of a combination of materials, for instance alloy steel with glass sections. In addition the vessel may also be lined with a suitable material such as glass and/or other materials which impart corrosion resistance or antifouling properties.

The photoinitiator may be any photoinitiator suitable for conducting photo polymerisation of ethylenically unsaturated monomers, especially water-soluble ethylenically unsaturated monomers. Suitable initiators for UV polymerisation used in accordance with the present invention include one or more of the compounds selected from the group, 2-Hydroxy-2-methyl-1-phenyl-propan-1-one, 1-[4-(2-Hydroxyethoxy)-phenyl]-2-hydroxy-2-methyl-1-propane-1-one, 50% 1-Hydroxycyclohexyl-phenyl-ketone (IRGACURE 184), 50% Benzophenone, Bis(2,4,6-trimethylbenzoyl)phenylphosphineoxide, 40-70% oxy-phenyl-acetic acid 2-[2 oxo-2-phenyl-acetoxy-ethoxy]-ethyl ester, 30-60% oxy-phenyl-acetic 2-[2-hydroxy-ethoxy]-ethyl ester, Phenyl glyoxylic acid methyl ester, Ethyl-2,4,6-Trimethylbenzoylphenylphosphinate.

The initiator system may be present in the non-aqueous liquid and/or aqueous monomer or monomer blend but preferably would be present in the aqueous monomer or monomer blend only. Where a photoinitiator is present in the non-aqueous liquid it may be added at the monomer feed point or alternatively added to the non-aqueous liquid at any stage prior to the monomer feed point provided that the photoinitiator is not exposed to any UV light prior to the monomer feed point. In a preferred form of the invention the photoinitiator is dissolved in the aqueous monomer or monomer blend suitably prior to the feeding or extrusion of the monomer through the orifices. Typically where the process involves photo polymerisation, the photoinitiator may be included at the stage where the aqueous monomer or monomer blend is made up or alternatively photoinitiator may be added as the aqueous monomer or monomer blend is flowed towards the orifices.

One advantage of the present process over the prior art, especially over the process of EP 952989 is that the reaction can be started at a relatively ambient temperature or even a cold temperature. For instance the non-aqueous liquid and monomer beads contained therein at the start of the reaction may be at a temperature below 30° C., preferably below 25° C., for instance below 20° C. The temperature of the aqueous monomer fed or extruded into the non-aqueous liquid may be between −5° C. and 15° C. The non-aqueous liquid as it enters the column should desirably have a temperature below 30° C., for instance below 20° C.

In a preferred aspect of the process, by starting the process with the non-aqueous liquid at a cooler temperature there is less risk that the reaction will overheat as it approaches completion. In the process of EP 952989 the starting temperature is much higher and under adiabatic polymerisation conditions the inevitable temperature rise may risk undesirably high temperatures as the polymerisation approaches completion.

Preferably the column of non-aqueous liquid leads downwardly to a discharge point at which the beads collect after they have reached the non-coalescent state. For instance, a substantially non-coalescing skin tends to form around each bead or the entire bead will have become non-coalescing. Accordingly, by the time the beads reach the polymer bead discharge point, it is possible to expose them to turbulence and agitation without significant risk of coalescence between the beads. As mentioned above the rate of flow of the non-aqueous liquid tends to be faster at the polymer bead discharge point than above it, since the vessel and therefore the column of non-aqueous liquid tends to narrow at the polymer bead discharge point. Accordingly the bottom of the column can be dimensioned so as to produce a faster rate of flow. For instance the rate of flow over the bottom 3 to 20%, usually 3 to 10%, of the total length of the column can be more than at higher points in the column for instance, this can be at least 1.5 times the rate of flow at the higher parts of the column, suitably at least twice and in some cases at least four or five times the flow rate at the higher parts of the column. It may be as much as 20 times but usually not more than 10 times the flow rate at the higher part of the column.

The suspension of polymer beads, which are preferably non-coalescent, which is removed from the column at the polymer bead discharge point can be a suspension of fully polymerized beads, in which event the final beads can be recovered from it, but often the beads are subjected to further bead polymerisation conditions in a suitable polymerisation vessel. This may be at the base of the column but can be in any suitable vessel into which the suspension can be transferred. Transfer may be by pumping or by merely dropping into the vessel, for instance through a valve. If full polymerisation is to be achieved in the column, the fall time in the column must be sufficiently long to permit this. Generally the fall time in the column is not more than 30 minutes, and a post-polymerisation stage is then usually desirable. If further polymerisation is required this may be achieved by maintaining the same polymerisation conditions after removal of the suspension from the column. Alternatively the polymerisation conditions applied after the suspension has passed through the polymer bead discharge point may be different from the polymerisation conditions employed in the column.

The post polymerisation conditions to which the beads are exposed in the post polymerisation stage (after discharge from the vessel) can be conventional conditions in which the suspension of beads in non-aqueous liquid is subjected to agitation in conventional manner so as to keep the beads in suspension in the non-aqueous liquid. The post polymerisation may be carried out in any suitable post polymerisation vessel. It may be desirable for such a post polymerisation vessel to be the same as the vessel employed in the main polymerisation reaction. For instance the polymer beads may be fed into the post polymerisation vessel and allowed to flow, either in an upwards or a downwards direction, through the non-aqueous liquid towards a bead discharge point. In this case the post polymerisation vessel would not be agitated or stirred. Alternatively it may be desirable for such a post polymerisation vessel to contain internal baffles or static mixers.

Preferably, the post polymerisation vessel may be at least one continuous stirred tank reactor (CSTR). One type of CSTR which may be employed is described in WO 02/49756 in which the polymer beads dispersed in the non-aqueous liquid may enter a column through an inlet tangentially in which the column contains a central rotating element wherein the dispersion of polymer beads is subjected to post polymerisation conditions before being fed through an outlet tangentially. Alternatively, other types of CSTRs, for instance containing central stirrers or impellers, may be employed as the post polymerisation vessel in which a dispersion of the polymer beads is injected through one end of the CSTR and subjected to post polymerisation conditions before being fed out of the vessel through a polymer bead discharge point. It may be possible to use a cascade of such CSTRs connected in series, for instance at least 2 or at least 3 and possibly up to 10 or up to 15 or more.

One particularly suitable type of post polymerisation vessel includes a CSTR which may be equipped with turbine agitators and heating jackets. Suitably the internal temperature may be for instance between 70 and 90° C. in combination with an internal pressure of between 50 and 300 m mb for instance between 50 and 200 mb. Where a cascade of CSTRs connected in series are employed, the transfer between each CSTR may be done by overflow pipes. Within such one or more CSTRs some of the water contained within the polymer beads and optionally a portion of some of the continuous phase liquid may be distilled off.

In general the removal of water from the polymer beads in the post polymerisation vessel desirably should achieve polymer beads that contain less than 20% residual water, for instance between 5 and 15% residual water. It may be desirable to remove further residual water from the polymer beads using other techniques such as evaporation.

The overall polymerisation conditions are generally such that the total period between introducing the monomer into the non-aqueous liquid and completion of polymerisation is between about 30 min and 3 hours, more usually between about 60 min and 1.5 or 2 hours.

The process can be conducted in a batch type process but preferably the process is substantially continuously with the result that there is a substantially uniform residence time in the process for all the material which is being polymerized.

Nevertheless, in some cases it may be desirable to carry out the process batchwise, wherein during each batch there is continuous addition of monomer until all the monomer has been added, there is continuous flow of non-aqueous liquid until all the beads have fallen through it, and the final polymerisation is conducted for sufficient time to ensure that full polymerisation has occurred of the beads which were introduced last. Preferably, the separation of the polymer beads is done under ambient conditions. By ambient conditions we mean at a temperature of between 15 and 30° C., for instance between 15 and 25° C.

The non-aqueous liquid usually needs to be purged with nitrogen before entering the vessel and conveniently this is conducted during the introduction or recycling of the non-aqueous liquid to the column or back to the column. Where the flow is upwards the non-aqueous liquid would be returned to the base of the column and where the flow is downwards the non-aqueous liquid would be returned to the top of the column.

The recovery of polymer beads from the polymerisation suspension typically involves separating the beads from the non-aqueous liquid. Preferably such recovery also involves removing the water before separating the polymer beads from the non-aqueous liquid. Preferably it also involves removing unreacted monomer.

Preferably the polymer beads in non-aqueous liquid is subjected to distillation optionally under reduced pressure (i.e., distillation which removes both water, volatile unreacted monomer and non-aqueous liquid). After distillation to reduce the water content to, for instance, below 10% by weight of the beads they may then be separated from the residual non-aqueous liquid by filtration or centrifugation and may then be subjected to further drying, for instance fluid bed drying.

In general once the polymer beads have been recovered from the suspension, the non-aqueous liquid from which the polymer beads have been recovered is subjected to the cleaning stage. The cleaning stage comprises a filtration step, which generally comprises passing this non-aqueous liquid from the suspension through a filtration unit. The filtration unit may be a dead end filter unit but preferably it is a cross-flow filtration unit. Therefore preferably the filtration step is across-flow filtration step which can be suitably achieved by passing this non-aqueous liquid through a cross-flow filtration unit.

Desirably in the cross-flow filtration step non-aqueous liquid should flow tangentially across the surface of a filter membrane. This is in contrast to other filtration systems in which the liquid to be filtered. Such other filtration systems might be operated employing a deadend filter or under conditions in which a cake layer can be built up. Generally, in the case of cross-flow filtration the non-aqueous liquid may flow at relatively high velocities on the membrane surface, for instance between 2 and 6 m/s, which would tend to prevent the build-up of a cake layer. Typically a proportion of the non-aqueous liquid passes through the filter membrane as permeate or filtrate which in accordance with the present invention may be regarded as a clarified non-aqueous liquid. The remainder of the non-aqueous liquid which does not pass through the filter membrane can be termed a retentate. The retentate can be recycled and then combined with further in coming non-aqueous liquid and then passed through the cross-flow filtration unit again. The retentate can be recycled several times around the unit until a desired level of solids in the retentate is achieved. Once a desirable concentration of solids in the retentate is achieved, the retentate can then be transferred and processed separately.

Cross-flow filtration is well documented in the literature, for instance Bertera R et al (June 1984), "Development Studies of cross-flow filtration", The Chemical Engineer 401:10; J F Richardson et al (2002), Coulson and Richardson's chemical engineering (Volume 2) (Fifth Edition) Butterworth Heinemann.

In a preferred aspect of this cleaning stage comprises a cross-flow filtration step which provides a stream of clarified non-aqueous liquid and a stream of retentate non-aqueous liquid in which the clarified non-aqueous liquid contains no measurable particles or a lower concentration of solid particles than the non-aqueous liquid prior to the cross-flow filtration step. Further, in this preferred aspect the cleaning stage the stream of retentate non-aqueous liquid contains a higher concentration of solid particles than the non-aqueous liquid prior to the cross-flow filtration step.

The filter membranes employed in the filtration step, particularly the cross-flow filtration step may be typically microfiltration (MF) membranes or ultrafiltration (UF) membranes or nanofiltration (NF) membranes. They may be constructed from a variety of materials. Membranes can be symmetric or asymmetric and in principle can be both porous or non-porous. Typically non-porous membranes would tend to be the NF membranes. UF and MF membranes tend to be porous and can be symmetrical or asymmetrical. One category of membranes includes symmetric (polymeric) membranes which possess a uniform (pore) structure over the entire thickness of the membrane. Alternatively asymmetric (polymeric) membranes may be used. Typically, microfiltration polymeric membranes may be formed from polyethylene, polyvinylidene fluoride (PVDF) and polytetrafluoroethylene (PTFE). Such membranes can be produced by stretching, molding and sintering fine-grained and partially crystalline polymers. Other polymeric membranes include polyester and polycarbonate membranes which can be made using irradiation and etching processes from polymers such as polypropylene, polyamides, cellulose acetate polyethersulphone and polysulphone can be used by a phase inversion process.

Suitable polymeric microfiltration and ultrafiltration membranes tend to be asymmetric and can also be made from a variety of materials but are primarily formed by a phase inversion process. Suitable ultrafiltration membranes may be constructed from polyvinylidene fluoride, polyacrylonitrile, polyethersulphone and polysulphone.

Alternatively the microfiltration and ultrafiltration membranes may be constructed from inorganic materials, such as ceramics and metals. Suitable commercial ceramic membranes may be made by slip casting processes. Typically this consists of two steps and begins with the preparation of a dispersion of fine particles (refer to as slip) followed by deposition of the particles on a porous support. Inorganic membranes that are commonly available and suitable for the present invention include composite containing a thin separation barrier on a support (e.g. ceramic materials, such as titanic-zirconia, or alumina).

Suitably the membranes may have a pore size of below 500 nm and usually below 200 nm. Preferably the pore size is less than 100 nm, more preferably less than 50 nm. Especially preferably the membrane should have a pore size in the range of between 1 nm and 45 nm and most preferably within the range of 1 nm and 40 nm, for instance between 10 nm and 40 nm.

Preferably a suitable membrane is constructed of ceramic materials, such as Al2O3, TiO2, or ZrO2 or a combination thereof.

Suitably the filtration step comprises dead-end filtration or preferably cross-flow filtration, which filtration step comprises a membrane or filter medium which has either
i) a mean pore diameter of less than 100 nm, preferably less than 50 nm, more preferably between 1-45 nm and most preferably within the range of 1 nm and 40 nm, for instance between 10 nm and 40 nm;
or
ii) a molecular weight cut off (MWCO) below 150,000 Da, preferably less than 60,000 Da, for instance 5,000 Da to 60,000 Da.

Typically, a filtration step may be carried out at ambient temperature, for instance between 15 and 30° C., suitably between 15 and 25° C., for instance 25° C. A transmembrane pressure of between 0.5 and 1.5 bar may be employed. A cross flow velocity of for instance between 3 and 4 m/s may be employed. Suitable attained fluxes may be between 25 and 75 kg/m$^2$/h. As an example a non-aqueous liquid, such as an organic solvent, resulting from a reverse-phase suspension polymerisation process which has been filtered in a pre-filtration step to remove any large sized particles can be concentrated by a factor of up to 25 employing a 20 kD ZrO2 ceramic membrane tube with a crossflow velocity of 3-4 m/s and permeances of 25 to 75 kg/m$^2$/h/bar at 25° C.

In some cases it may be desirable to filter the non-aqueous liquid in a pre-filtration step to remove any large sized particles, for instance large sized polymer fines, before carrying out the filtration step in order to minimise any risk of damaging the filtration membrane for the filtration step. Generally this pre-filtration step should employ a filter which would have a higher degree of stability to damage from the larger sized particles. Such filters for this pre-filtration step would tend to have larger pore sizes which are sufficiently small to trap the large particles and yet allow the smaller sized fines to flow through. The pre-filter may consist of a polymeric or metal mesh wire filter with a mesh size of 10 to 200 micrometer.

More preferably the stream of retentate non-aqueous liquid is subjected to an evaporation step followed by condensation to provide a stream of condensed non-aqueous liquid. Preferably still the stream of clarified non-aqueous liquid is combined with the stream of condensed non-aqueous liquid to form a cleaned non-aqueous liquid.

In the process of the present invention the stream of clarified non-aqueous liquid forms a major part of the cleaned non-aqueous liquid. Typically the ratio of stream of clarified non-aqueous liquid to stream of retentate non-aqueous liquid should be greater than 1:1, preferably greater than 2:1 and more preferably greater than 5:1. Most preferably the ratio should be at least 9:1, for instance between 9:1 and 100:1, such as between 9:1 and 50:1 or between 9:1 and 20:1.

The evaporation step applied to the retentate non-aqueous liquid may be carried out in a conventional evaporator apparatus, which are well documented in the literature. Preferably the evaporation step is carried out in a wiped film evaporator. Wiped film evaporators are well documented in the literature. In general the wiped film evaporator employs a heated surface onto which the non-aqueous liquid is transferred as a thin film. The heated surface is continually wiped in order to ensure an even liquid film at the heating surface. The non-aqueous liquid is evaporated leaving behind impurities which are removed from the evaporator. Typically a wiped film evaporator may consist of one or more cylinders heated with jackets and a film scraper. In such an apparatus the inner surface(s) of the cylinder(s) should be contacted with the non-aqueous liquid and the film scraper would scrape the charging non-aqueous liquid to an even liquid film over the heating surface and move down. During this process as the non-aqueous liquid would generally have a lower boiling point down the impurities it would evaporate and the impurities expelled from the bottom of the evaporator.

The cleaning stage may also comprise a washing step to remove any insoluble impurities and/or impurities dissolved in the non-aqueous liquid, for instance stabiliser materials or protective colloids. Desirably the condensed non-aqueous liquid and/or the clarified non-aqueous liquid are subjected to a washing step. This may be achieved by treating the condensed non-aqueous liquid stream and clarified non-aqueous liquid stream separately using one or more washing steps. Preferably the condensed non-aqueous liquid stream and the clarified non-aqueous liquid stream are combined into a single stream and this single stream is subjected to one or more washing steps. In general the washing step or steps should be carried out using an aqueous alkali. Preferably the alkali is an alkali metal hydroxide or ammonium hydroxide. More preferably the aqueous alkali is an aqueous solution of sodium hydroxide or potassium hydroxide. Following the washing stage or stages the stream of cleaned non-aqueous liquid should be suitable for further reverse-phase suspension polymerizations. A washing step that employs alkali may be referred to as caustic washing. The concentration of the alkali solution may be up to about 20% by weight. Alternatively the washing step may include an aqueous solution of an acid, for instance hydrochloric acid solution in water. The concentration of the acid solution may be up to about 20% by weight. The exact concentration of the aqueous alkali or aqueous acid may depend on the amount of impurities.

Caustic washing can be employed as the washing step for the removal of insoluble, such as polymer fine particles, and soluble impurities, such as initiators, inhibitors, chain transfer agents from the non-aqueous liquid. The caustic washing step can be achieved by mixing and alkali, such as sodium hydroxide or potassium hydroxide aqueous solution, with the nonaqueous liquid, such as the retentate from a cross-flow filtration, and then allowing the mixture to form two phases. The two phases can be separated, for instance in a liquid/liquid separator, such as a settler or centrifuge. The weight ratio of the two phases may be for instance in the range of 10:90 to 40:60 water:nonaqueous liquid, preferably 15:85 to 30:70, especially around 20:80. The particular ratio may depend upon the amount of impurities.

When used in combination with the filtration step, and optionally also the evaporation step, the use of a washing step, especially a caustic washing step, may lead to a more efficient cleaning of the non-aqueous liquid. The more efficient the cleaning stage is the less risk there is that when the cleaned non-aqueous liquid is used in a reverse-phase suspension polymerisation process it would have an adverse effect on the polymerisation process, for instance instability.

Generally after the non-aqueous liquid has been subjected to the filtration step and prior to the washing step, for instance caustic washing step, the insoluble impurities may have a size smaller than 100 nm, preferably smaller than 50 nm or insoluble impurities with a molecular weight cut off (MWCO) below 150,000 Da, preferably lower than 60,000 Da.

The monomers which can be used for making the bead polymers of the invention can be any of those conventionally used for the production of water soluble or superabsorbent polymer beads from ethylenically unsaturated material. The monomers are usually preferably ethylenically unsaturated monomers and frequently acrylic monomers or vinylformamide.

The ethylenically unsaturated monomers can be water-soluble or water-insoluble ethylenically unsaturated monomers. The ethylenically unsaturated monomers may be obtained by a chemically catalysed process, a biologically catalysed process or a biological process.

Suitably the monomer or monomer blend may be water-soluble or at least partially hydrophilic or amphiphilic. When the monomer, each monomer or blend of monomers are water-soluble preferably they have a solubility of at least 5 g in 100 mL of water at 25° C.

N-vinylformamide can be polymerized to form polyvinylformamide which can subsequently be partially or wholly hydrolysed to provide a polymer containing vinyl amine units.

Water-soluble ethylenically unsaturated monomers can be carboxylic acids of formula (I)

or salts thereof, in which $R^1$, $R^2$ and $R^3$ are the same or different and are hydrogen, $C_{1-2}$-alkyl, carboxy or $C_{1-2}$-alkyl substituted with carboxy, (II)

wherein $R^7$, $R^8$ and $R^9$ are the same or different and are hydrogen or $C_{1-2}$-alkyl, E is $C_{2-5}$-alkylene, $R^4$, $R^5$ and $R^6$ are the same or different and are $C_{1-4}$-alkyl and X is a suitable anion, amides of formulae wherein $R^7$, $R^8$, $R^9$, E, $R^4$, $R^5$, $R^6$ and X have the meaning as indicated above, $R^{10}$ is hydrogen or methyl, L is $C_{2-5}$-alkylene, and M is a suitable cation,
vinyl derivatives or diallylammonium derivatives.

Examples of carboxylic acids of formula I are acrylic acid, methacrylic acid, crotonic acid, itaconic acid, maleic acid and fumaric acid. Salts thereof can be ammonium or alkali metal salts thereof. Examples of alkali metals are sodium and potassium.

$C_{1-2}$-Alkyl can be methyl or ethyl. Examples of $C_{2-5}$-alkylene are ethylene, trimethylene, propylene, 2-methylpropylene, tetramethylene, ethylethylene and pentamethylene. Examples of $C_{1-4}$-alkyl are methyl, ethyl, propyl, isopropyl and butyl, isobutyl, sec-butyl and tert-butyl. Examples of suitable anions are halogenide, sulfate and $C_{1-4}$-alkylsulfate. An example of $C_{1-4}$-alkylsulfate is methylsulfate. Examples of a halogenide are bromide and chloride. A preferred halogenide is chloride. Examples of suitable cations are hydrogen, ammonium and alkali metal.

Examples of esters of formula II are dimethylaminoethylacrylate methyl chloride quaternary salt, diethylaminoethylacrylate ethyl chloride quaternary salt and dimethylaminoethylmethacrylate methyl chloride quaternary salt.

Examples of amides of formulae III, IV or V are acrylamide, methacrylamide, crotonamide, dimethylaminoethylacrylamide methyl chloride quaternary salt, diethylaminoethylacrylamide ethyl chloride quaternary salt, dimethylaminoethylmethacrylamide methyl chloride quaternary salt and 2-acrylamido-2-methylpropane sulfonic acid.

Examples of vinyl derivatives are vinylphosphonic acid or vinylsulfonic acid and salts thereof, such as ammonium or alkali metal salts thereof, N-vinylformamide, N-vinylpyrrolidinone and 1-vinylimidazole. An example of a diallylammonium derivative is diallyldimethylammonium chloride.

Water-insoluble ethylenically unsaturated monomers can be esters of carboxylic acids of formula I with a $C_{1-18}$-alkanol.

Examples of $C_{1-18}$-alkanols are methanol, ethanol, propanol, isopropanol, butanol, hexanol, 2-ethylhexanol and octadecanol.

Examples of water-insoluble ethylenically unsaturated monomers are methyl acrylate, ethyl acrylate, butyl acrylate, 2-ethyl hexyl acrylate, stearyl acrylate, methyl methacrylate and stearyl methacrylate.

Preferably the ethylenically unsaturated monomers are water-soluble.

More preferred ethylenically unsaturated monomers are water-soluble and are selected from the group consisting of carboxylic acids of formula or salts thereof, in which $R^1$, $R^2$ and $R^3$ are the same or different and are hydrogen or methyl, carboxy or methyl substituted with carboxy,
esters of formula wherein $R^7$, $R^8$ and $R^9$ are the same or different and are hydrogen or methyl, E is $C_{2-3}$-alkylene, $R^4$, $R^5$ and $R^6$ are the same or different and are $C_{1-3}$-alkyl and X is a suitable anion,
amides of formulae wherein $R^7$, $R^8$, $R^9$, E, $R^4$, $R^5$, $R^6$ and X have the meaning as indicated above, $R^{10}$ is hydrogen or methyl, L is $C_{2-5}$-alkylene, and M is a suitable cation.

Examples of $C_{2-3}$-alkylene are ethylene, trimethylene and propylene. Examples of $C_{1-3}$-alkyl are methyl, ethyl, propyl and isopropyl.

Even more preferred ethylenically unsaturated monomers are water-soluble and are selected from the group consisting of carboxylic acids of formula

(I)

or salts thereof, in which $R^1$ is hydrogen or methyl and $R^2$ and $R^3$ are both hydrogen,
esters of formula (II)

wherein $R^7$ is hydrogen or methyl, and $R^8$ and $R^9$ are both hydrogen, E is ethylene, $R^4$, $R^5$ and $R^6$ are the same or different and are $C_{1-2}$-alkyl, and X is halogenide, sulfate or $C_{1-4}$-alkylsulfate,
amides of formulae

(III)

(IV)

(V)

wherein $R^7$, $R^8$, $R^9$, E, $R^4$, $R^5$ and $R^6$ and X have the meaning as indicated above, $R^{10}$ is hydrogen or methyl, L is $C_{2-5}$-alkylene, and M is hydrogen, ammonium or an alkali metal.

Most preferred ethylenically unsaturated monomers are water-soluble and are selected from the group consisting of acrylic acid or salts thereof, esters of formula (II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate,
acrylamide and amides of formula (V)

wherein $R^7$, $R^8$, $R^9$ have the meaning as indicated above, L is $C_{2-4}$-alkylene, $R^{10}$ is hydrogen, and M is hydrogen, ammonium or an alkali metal.

Examples of $C_{2-4}$-alkylene are ethylene, trimethylene, propylene, 2-methylpropylene, tetramethylene and ethylethylene.

Even most preferred the ethylenically unsaturated monomer is water-soluble and is either acrylamide or a mixture of acrylamide with water-soluble ethylenically unsaturated monomer selected from the group consisting of acrylic acid or salts thereof, and esters of formula (II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate.

Preferably, the amount of acrylamide in the mixture of acrylamide with water-soluble monomethylenically unsaturated monomer selected from the group consisting of acrylic acid or salts thereof, and esters of formula (II)

wherein $R^7$, $R^8$ and $R^9$ are hydrogen, E is ethylene, $R^4$, $R^5$ and $R^6$ are the same or different and are $C_{1-2}$-alkyl, and X is chloride, sulfate or $C_{1-4}$-alkylsulfate, is at least 30% by weight based on the weight of the monomer mixture.

When the monomer or mixture of monomers comprises acrylamide, the acrylamide may have been produced by a suitable process, for instance by hydrolysis of acrylonitrile. Typically this may be one of the known chemically catalysed processes using inorganic catalysts such as Raney copper. Preferably however, the acrylamide would have been prepared using a biological or biologically catalysed process. Suitably this may be achieved by contacting acrylonitrile with a nitrile hydratase enzyme, for example as documented in the patents and literature. Superior polyacrylamide products may be obtained by employing the process of the present invention to polymerize acrylamide, optionally in combination with other ethylenically unsaturated monomers, wherein acrylamide has been obtained by a biological process. Such polyacrylamides would exhibit superior properties as flocculants for instance for water treatment (including sewage sludge treatment), mining applications and as retention/drainage aids in the paper industry.

Where the monomer, each monomer or monomer blend contains at least one of amphiphilic monomers and/or partially hydrophilic monomers desirably they may be any such monomers which are known in the literature.

Amphiphilic monomers or partially hydrophilic monomers are defined as monoethylenic unsaturated based monomers which have at least one hydrophilic group and at least one hydrophobic group in its structure. The partial solubility in water can be based on the presence of anion and/or cation and/or other neutral hydrophilic moieties.

They include, for instance, acrylamide-derived cationic monomer (Formula I) or acrylate-derived cationic monomer (Formula II) containing a hydrophobic chain and with the general formula:

Where:
R1, R2, R3, R4, R5, R6, independently, can be a hydrogen or an alkyl chain containing 1 to 4 carbons
Q: an alkyl chain containing 1 to 8 carbons
R7: an alkyl or alkenyl or arylalkyl chain containing 6 to 30 carbons
X: a halide selected from the group including chloride, bromide, iodide, fluoride or a counterion with a negative charge A preferred structure for formula (I) is when R1═R2═R3═R4═H, which generates an acrylamide moiety. Another preferred structure is obtained when R1═R2═R4 and R3═CH3.

Then a methacrylamide derivative is generated.

Similar to formula (I), a preferred structure for formula (II) is when R1═R2═R3═H, which generates an acrylate moiety. Another preferred structure is obtained when R1═R2═H and R3═CH3. Then a methacrylate derivative is generated.

Among all alkyl possibilities for Q, preferably Q is either an ethyl or a propyl group Preferably, R5═R6 and are either methyl or ethyl moieties For the substitute R7, preferred structures are hexyl, octyl, decyl, dodecyl, hexadecyl, octadecyl or benzyl Examples of preferred structures for the invention having the formula (I) are N-acrylamidopropyl-N,N,dimethyl-N-dodecyl ammonium chloride, N-methacrylamidopropyl-N,N,dimethyl-N-dodecyl ammonium chloride, N-acrylamidopropyl-N,N,dimethyl-N-dodecyl ammonium bromide, N-methacrylamidopropyl-N,N,dimethyl-N-dodecyl ammonium bromide, N-acrylamidopropyl-N,N,dimethyl-N-octadecyl ammonium chloride, N-methacrylamidopropyl-N,N,dimethyl-N-octadecyl ammonium chloride, N-acrylamidopropyl-N,N,dimethyl-N-octadecyl ammonium bromide, N-methacrylamidopropyl-N,N,dimethyl-N-octadecyl ammonium bromide, N-acrylamidopropyl-N,N,dimethyl-N-benzyl ammonium chloride, N-methacrylamidopropyl-N,N,dimethyl-N-benzyl ammonium chloride, N-acrylamidopropyl-N,N,dimethyl-N-benzyl ammonium bromide, N-methacrylamidopropyl-N,N,dimethyl-N-benzyl ammonium bromide. Examples of preferred structures for the invention having the formula (II) are N,N-dimethylaminoethyl acrylate-N-dodecyl chloride, N,N-dimethylaminoethyl methacrylate-N-dodecyl chloride, N,N-dimethylaminoethyl acrylate-N-dodecyl bromide, N,N-dimethylaminoethyl methacrylate-N-dodecyl bromide, N,N-dimethylaminoethyl acrylate-N-octadecyl chloride, N,N-dimethylaminoethyl methacrylate-N-octadecyl chloride, N,N-dimethylaminoethyl acrylate-N-octadecyl bromide, N,N-dimethylaminoethyl methacrylate-N-octadecyl bromide, N,N-dimethylaminoethyl acrylate-N-benzyl chloride, N,N-dimethylaminoethyl methacrylate-N-benzyl chloride, N,N-dimethylaminoethyl acrylate-N-benzyl bromide, N,N-dimethylaminoethyl methacrylate-N-benzyl bromide Other amphiphilic monomer structures can be based on neutral hydrophilic groups. Their formula among other can be based on acrylate-derivative (Formula III) or allyl-derivative (Formula IV). In this case, the solubility is water is enhanced by the presence of ethylene oxide groups present.

Where:
k and l, are independently two positive real numbers included in the range from 0 to 100, with k+l>3
R1 can be a hydrogen or an alkyl chain containing 1 to 4 carbons
R2 can be an alkyl, alkenyl or arylalkyl chain containing from 1 to 30 carbons
Q can be O or NR4 where R4 is selected from H, alkyl, cycloalkyl, heterocycloalkyl, aryl or hetaryl
R3 can be either H an alkyl group containing 1 to 30 carbons or an alkenyl group containing 3 to 30 carbons or an arylalkyl chain containing 6 to 30 carbons Preferably, R1 is either a hydrogen atom or a methyl group.

Preferably, k is a real number included in the range from 3 to 50 to bring the solubility in water.

Preferably, l is a real number included in the range from 0 to 30

Examples of preferred R2 groups for the formula (II) and (III) are methyl, ethyl, butyl, pentyl, hexyl, dodecyl, hexadecyl, octadecyl or benzyl Examples of R3 groups for the formula (II) and (III) are hydrogen, methyl, ethyl, hexyl, decyl, dodecyl, hexadecyl, octadecyl, benzyl or tristyrylphenyl One preferred substructures family derived for the formula (III) is accessible when the value of l in (III) is equal to zero. Then, a new the amphiphilic monomer based on neutral hydrophilic group can be defined by the Formula (V)

(V)

Where:
k is a positive real numbers included in the range from 0 to 100
R1 can be a hydrogen or an alkyl chain containing 1 to 4 carbons
R2 can be an alkyl, alkenyl or arylalkyl chain containing from 1 to 30 carbons
Q can be O or NR4 where R4 can be a hydrogen or an alkyl group containing 1 to 4 carbons
R3 can be either H an alkyl group containing 1 to 30 carbons or an alkenyl group containing 3 to 30 carbons or an arylalkyl chain containing 6 to 30 carbons Preferably, R1 is either a hydrogen atom or a methyl group.

Preferably, k is a real number included in the range from 3 to 50 to bring the solubility in water.

Preferably, l is a real number included in the range from 0 to 30

Examples of R3 groups for the formula (V) are hydrogen, methyl, ethyl, hexyl, decyl, dodecyl, hexadecyl, octadecyl, benzyl or tristyrylphenyl Formula (V) include, among other, commercial products like for example Visiomer® C18 PEG 1105 MA W, Plex® 6877-0 or Lutencryl® 250 which are trade names for a methacrylate derivative based on C16C18 fatty alcohol ethoxylated. Sipomer® BEM is another example of commercial product which fulfils the formula (V). It is a methacrylate derivative based on behenyl alcohol ethoxylated. Another preferred example is Sipomer® SEM which is a polyoxyethylene methacrylate ω-tristyrylphenyl monomer.

Other amphiphilic monomer structures based on neutral hydrophilic groups can be described by the formula (V)

(VI)

Where:
k and l and m, are independently three positive real numbers included in the range 0 to 100, with k+l+m>3
R1 can be a hydrogen or an alkyl chain containing 1 to 4 carbons
R2 can be either —($C_nH_{2n}$)— or —O—($C_nH_{2n}$)— or —C(O)—O—$C_nH_{2n}$— or —C(O)—NR7—$C_nH_{2n}$)— with R7 which can be a hydrogen or an alkyl containing 1 to 4 carbons. In all four different structures of R2, n is a whole number from 1 to 6
R3, R4, R5 are independently either H or an alkyl group containing 1 to 30 carbons or an arylalkyl group containing 6 to 30 carbons. Moreover, to be amphiphilic monomers, molecules based on the formula (VI) need to have at least one of the moieties R3, R4 or R5 equivalent to H. In this case, [CH2-CH($R_i$)—O]$_x$ is a poly(ethyleneoxide) group which is the neutral hydrophilic group of the structure
R6 can be either H an alkyl group containing 1 to 30 carbons or an alkenyl group containing 3 to 30 carbons or an arylalkyl chain containing 6 to 30 carbons Preferably, R1 is either a hydrogen atom or a methyl group.

Examples of preferred R3, R4 or R5 groups for the formula (VI) are hydrogen, methyl, ethyl, butyl, pentyl, hexyl, dodecyl, hexadecyl, octadecyl or benzyl Examples of R6 groups for the formula (VI) are hydrogen, methyl, ethyl, hexyl, decyl, dodecyl, hexadecyl, octadecyl, benzyl or tristyrylphenyl.

Depending on the ethylenically unsaturated monomer or monomer mixture used, the polymers produced by the process of the present invention can be anionic, cationic or non-ionic.

When the beads are to be superabsorbent, the monomers are usually anionic (for instance acrylic acid or salt such as sodium acrylate) or a blend thereof with acrylamide.

When the polymer is to be water soluble, it may be nonionic (for instance polyacrylamide homopolymer) or anionic or cationic and is often formed from a blend of acrylamide or other water soluble non-ionic monomer with ionic monomer. Desirably water-soluble polymers may have a solubility in water of at least 5 g per 100 mL of water at 25° C.

Water soluble bead polymers are typically used as viscosifiers, coagulants or flocculants, including retention aids for paper making. They can be anionic, cationic or non-ionic.

Typically they have intrinsic viscosity (IV), of at least 4 dl/g although lower IV beads (e.g., IV 1-4 dl/g) of cationic polymers such as poly diallyl dimethyl ammonium chloride (poly DADMAC) can also be made by this process and used as coagulants. The IV will usually always be above about 0.5 dl/g since lower molecular weight polymers tend to be difficult to put into satisfactory dry bead form.

Intrinsic viscosity of polymers may be determined by preparing an aqueous solution of the polymer (0.5-1% w/w) based on the active content of the polymer. 2 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per litre of deionised water) and the whole is diluted to the 100 ml mark with deionised water. The intrinsic viscosity of the polymers is measured using a Number 1 suspended level viscometer at 25° C. in 1M buffered salt solution. Intrinsic viscosity values stated are determined according to this method unless otherwise stated.

The weight average molecular weight of the polymer beads should generally be at least 1 million g/mol, for instance at least 2 million g/mol and often at least 3 million g/mol, preferably at least 5 million g/mol. In some cases the weight average molecular weight may be at least 7 million g/mol and sometimes at least 10 million g/mol. The weight average molecular weight may be as high as 18 or 20 million, for instance as high as 25 million g/mol or even as high as 30 million g/mol or higher. The weight average molecular weight can be determined by static light scattering, small angle neutron scattering, x-ray scattering or sedimentation velocity.

Gel permeation chromatography beads may be formed of acrylamide or blends of acrylamide with other monomers and sufficient polyethylenic cross linker to restrict their swelling in water to 0.2 to 2 times their weight, e.g., 15 to 30%.

The distribution of sizes of polymer beads can, in the invention, be controlled primarily by the distribution of sizes of the feeding or extrusion orifices and the feeding or extrusion conditions. If (as is usual) all the orifices have substantially the same size then it is possible in the invention to obtain beads which are substantially all of the same size. Accordingly the invention is useful both where a narrow size range is desirable (e.g., as flocculant or viscosifier) and where it is essential for optimum performance (e.g., in a slow release composition).

According to a further aspect of the invention we provide novel beads of water soluble or water swellable polymeric material. These beads are obtainable by the process of the invention or employing the apparatus of the invention.

The cleaned non-aqueous liquid resulting from the process or employing the apparatus contains lower levels of impurities than non-aqueous liquids cleaned by conventional means. This makes the non-aqueous liquid particularly suitable for use in a reverse phase polymerisation process. Therefore when the cleaned non-aqueous liquid resulting from the present invention is employed in the inventive reverse phase polymerisation process for making water-soluble or water swellable polymer process and product benefits are observed. Furthermore, the water soluble or water swellable polymer beads obtainable by the process or apparatus of present invention exhibit more consistent quality and performance properties.

In addition the water-soluble or water swellable polymer beads obtainable by the process or apparatus according to the present invention can be manufactured in large amounts, for instance held in a container containing at least 500 kg of said polymer beads or even up to 1 tonne or more. Suitably the container may be a single storage hopper, a single container used for transportation of the product. Especially desirably the container may be a holding vessel which contains a plurality of single containers, for instance a transportation vehicle, a boat or a ship.

Desirably the process or apparatus of the present invention enable water soluble or water swellable polymer beads to be produced which may have very low levels of residual unreacted monomer, for instance acrylamide. Frequently the amount of residual unreacted monomer, for instance acrylamide, may be less than 500 ppm, preferably less than 200 ppm. The amount of residual unreacted monomer, for instance acrylamide, may be as low as 1 ppm or as low as 5 ppm of 10 ppm.

Suitably the polymer beads are of water soluble polymeric material.

In another aspect of the invention the beads contain an active ingredient distributed substantially uniformly through the polymeric material, which is often a cross linked material.

In some cases it may be desirable to grind the so form the polymer beads to produce a polymer powder. Grinding equipment which is suitable for grinding polymers into a powder is well known to those skilled in the art. Thus the process according to the present invention may be further modified such that the so formed polymer beads are ground to form a powder.

Suitable apparatus for carrying out the invention is illustrated diagrammatically in the accompanying drawings.

FIG. 1 shows one type of apparatus, consisting of a cylindrical vessel (1) containing to concentric walls. Monomer beads are formed by extrusion of aqueous monomer employing orifices (5) for feeding or extruding monomer. The monomer beads enter the volume of non-aqueous liquid (2) at the monomer feed point (4) and are initiated and irradiated using a UV source and descend as polymerising beads through a volume of non-aqueous liquid between the concentric walls of the vessel. The suspension of polymer beads is removed through the polymer discharge point (3) situated at the base of the vessel.

EXAMPLE

Inverse suspension polymerisation of an aqueous monomer is carried out in Exxsol D40 as a non-aqueous liquid. Aqueous monomer phase comprised of aqueous monomers, preferably acrylamide, dimethylaminoethyl acrylate methyl chloride quaternary salt. A stabilizer (0.1 wt-% with respect to dispersed phase; a copolymer from methyl methacrylate, stearyl methacrylate, acrylic acid and methacrylic acid) is added to the continuous phase and into the dispersed monomer solution an initiator—2,2'-Azobis(2-methylpropionamidine)dihydrochloride—is mixed in. After the polymerization, solid polymer is separated from the continuous phase (Exxsol D40) which is subsequently filtered through cross-flow filtration setup.

The Exxsol D40 resulting from the suspension polymerisation process prior to any cleaning contains fine particles (residual polymer product and other materials) and the uncleaned Exxsol D40 is usually turbid due to insolubility of the product in Exxsol D40. Accumulation of these fines leads to process instability, hinders polymerization, and has impact on the product quality. Removal of these impurities is therefore highly desirable.

Figure 1:
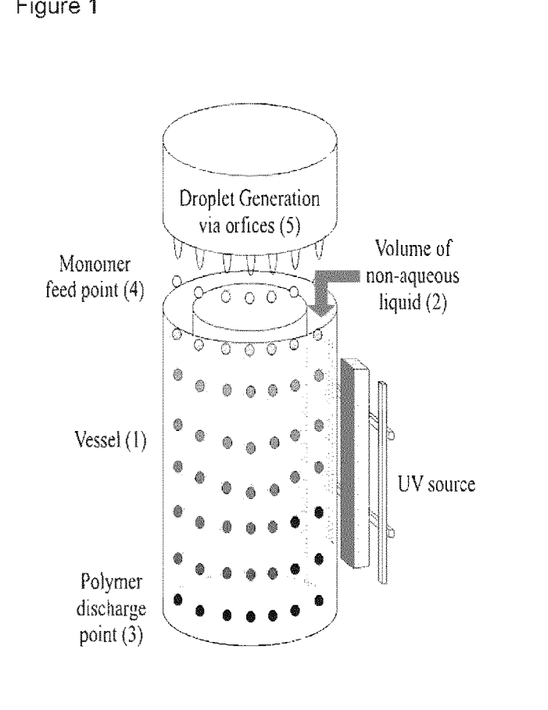
Figure 2:
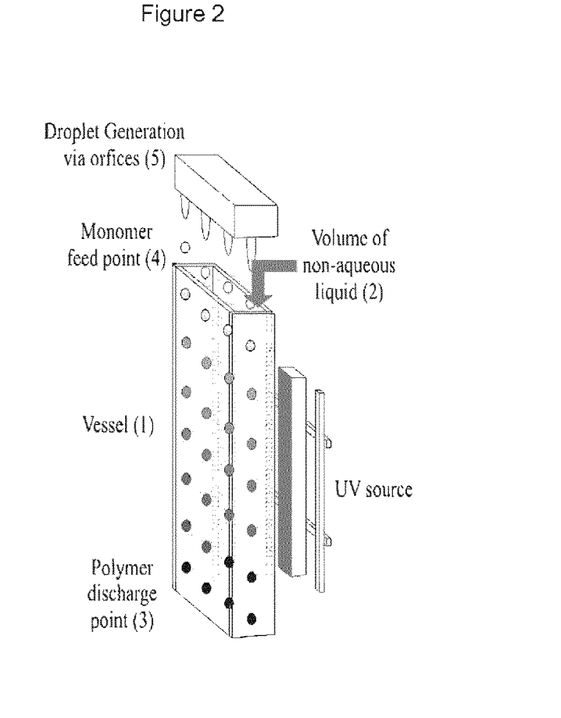
FIG. 2 shows another type of apparatus and differs from the apparatus of FIG. 1 in that the vessel (1) has a rectangular horizontal cross-section.
Figure 3:
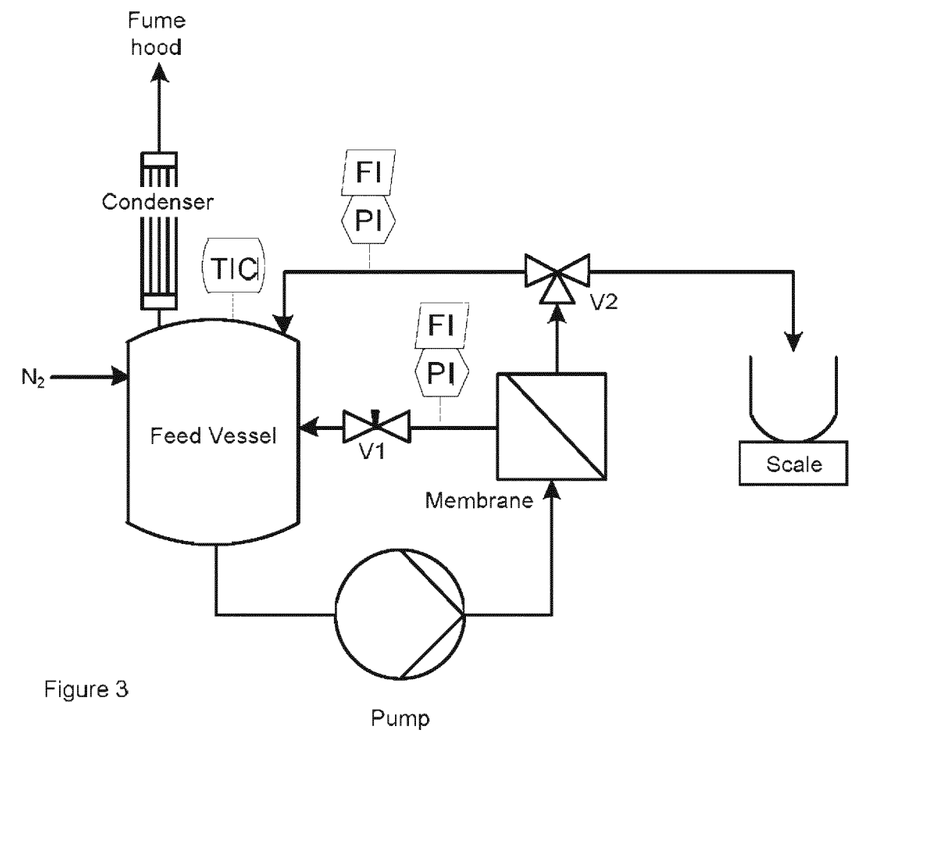
FIG. 3: Schematic representation of the cross-flow testing setup used for the experiments.

Cross-flow filtration setup which is used in experiments is shown in FIG. 3. The cross-flow setup consists of a feed vessel and a circulation loop containing the membrane module and a heat exchanger (not shown). The permeate can be recycled to the feed vessel or can be withdrawn and collected in a permeate vessel. The transmembrane pressure, TMP, can be adjusted using valve V1. The TMP was set to values of 0.5 to 1.5 bar. The feed velocity was varied between 1.5 and 4 m/s. Fl and PI are flow rate and pressure indicators. TIC—temperature indication and control of the temperature in the feed vessel. V2 valve is allowing to switch from running the concentrate back into the feed vessel to bleeding it out of the circulation loop.

The example describes test performed on a setup in FIG. 3 using Pall Schumacher membrane with a nominal pore size of 10 nm. Membrane had a length of 100 cm and was mounted in a stainless steel tubular module. Experiment was conducted at 30° C.

Solvent flux of a pure Exxsol D40 under TMP of 0.5 bar was 100 kg m$^{-2}$ h$^{-1}$. Filtration of Exxsol D40 previously used in polymerizations resulted in stable performance—flux of around 25 kg m$^{-2}$ h$^{-1}$ remained constant over the concentration factor of 13. Permeat was of a good quality, transparent, and successfully used in polymerisation reactions again resulting in a product of satisfactory quality.

The invention claimed is:

1. A reverse-phase suspension polymerization process for manufacturing polymer beads, comprising:
   forming a suspension of monomer beads from a water-soluble ethylenically unsaturated monomer or monomer blend in a non-aqueous liquid in a vessel,
   initiating polymerization to obtain polymer beads,
   removing a suspension of the polymer beads in the non-aqueous liquid from the vessel and recovering water soluble polymer beads from the suspension, in which the non-aqueous liquid contains impurities which comprise particles, and then
   transferring the non-aqueous liquid from the suspension to a cleaning stage, in which the cleaning stage provides a cleaned non-aqueous liquid suitable for use in a reverse-phase suspension polymerization process, which cleaning stage comprises removing particles from the non-aqueous liquid in at least one filtration operation, wherein the at least one filtration operation is cross-flow filtration using a membrane or filter formed from a member selected from the group consisting of ceramics, metals, polytetrafluoroethylene, and polyvinylidene fluoride, wherein the membrane or filter used has a pore size of less than 500 nm.

2. The process of claim 1, wherein the cleaned non-aqueous liquid is recycled back into the reverse-phase suspension polymerization process.

3. The process of claim 1, performed continuously.

4. The process of claim 1, wherein the non-aqueous liquid is provided as a volume in the vessel, which volume extends between at least one polymer bead discharge point and at least one monomer feed point, and in which the aqueous monomer or monomer blend is extruded through one or more orifices to form monomer beads which are allowed to flow towards the polymer bead discharge point, and
   initiating polymerization of the aqueous monomer beads to form polymerizing beads,
   wherein the polymerizing beads have formed polymer beads when they reach the polymer bead discharge point.

5. The process of claim 4, wherein the polymer beads removed from the vessel at the polymer bead discharge point are subjected to a post polymerization stage.

6. The process of claim 1, wherein the membrane or filter medium has either
   i) a mean pore diameter of less than 100 nm; or
   ii) a molecular weight cut off (MWCO) below 150,000 Da.

7. The process of claim 1, wherein the process is conducted in two or more vessels in parallel.

8. The process of claim 1, further comprising grinding the formed polymer beads to produce a polymer powder.

9. The process of claim 1, wherein the cleaning stage comprises a cross-flow filtration operation which provides a stream of clarified non-aqueous liquid and a stream of retentate non-aqueous liquid in which the clarified non-aqueous liquid comprises a lower concentration of particles than the non-aqueous liquid prior to the cross-flow filtration operation, and the retentate non-aqueous liquid comprises a higher concentration of particles than the non-aqueous liquid prior to the cross-flow filtration operation, and in which the stream of retentate non-aqueous liquid is subjected to an evaporation operation and a condensation operation to provide a stream of condensed non-aqueous liquid,
   wherein the cleaning stage also comprises combining the stream of clarified non-aqueous liquid and the stream of condensed non-aqueous liquid and forming the cleaned non-aqueous liquid.

10. The process of claim 9, wherein the evaporation operation comprises wiped film evaporation.

11. The process of claim 1, wherein the non-aqueous liquid comprises an amphipathic stabilizer.

12. The process of claim 1, wherein the water-soluble ethylenically unsaturated monomer or monomer blend comprises at least one monomer selected from the group consisting of acrylamide, methacrylamide, N-vinyl pyrrolidone, 2-hydroxy ethyl acrylate, acrylic acid or a salt thereof, methacrylic acid or a salt thereof, itaconic acid or a salt thereof, maleic acid or a salt thereof, 2-acrylamido-2-propane sulphonic acid or a salt thereof, vinyl sulphonic acid or a salt thereof, allyl sulphonic acid or a salt thereof, dimethyl amino ethyl acrylate or an acid salt or quaternary ammonium salt thereof, dimethyl amino ethyl methacrylate or an acid salt or quaternary ammonium salt thereof, dimethyl amino propyl acrylamide or an acid salt or quaternary ammonium salt thereof, and dimethyl amino propyl methacrylamide or an acid salt or quaternary ammonium salt thereof.

13. The process of claim 12, wherein at least one monomer is prepared by a chemically catalyzed process, a biologically catalyzed process or a biological process.

14. The process of claim 12, wherein the acrylamide is prepared by a biological catalyzed process or a biological process.

* * * * *